(12) United States Patent
Kritt et al.

(10) Patent No.: US 7,880,719 B2
(45) Date of Patent: Feb. 1, 2011

(54) RECOGNITION AND CAPTURE OF WHITEBOARD MARKUPS IN RELATION TO A PROJECTED IMAGE

(75) Inventors: Barry Alan Kritt, Raleigh, NC (US); Douglas Alan Law, Chapel Hill, NC (US); Thomas S. Mazzeo, Durham, NC (US); Rodney Edward Shepard, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1350 days.

(21) Appl. No.: 11/387,509

(22) Filed: Mar. 23, 2006

(65) Prior Publication Data

US 2007/0222747 A1    Sep. 27, 2007

(51) Int. Cl.
*G09G 5/00* (2006.01)

(52) U.S. Cl. .................. 345/156; 345/173; 345/175

(58) Field of Classification Search .......... 345/156, 345/173, 175
See application file for complete search history.

(56) References Cited

U.S. PATENT DOCUMENTS

| | | | |
|---|---|---|---|
| 5,528,263 A * | 6/1996 | Platzker et al. .............. 345/156 |
| 6,219,057 B1 | 4/2001 | Carey et al. |
| 6,388,654 B1 * | 5/2002 | Platzker et al. .............. 345/156 |
| 6,483,555 B1 * | 11/2002 | Thielemans et al. ......... 348/745 |
| 6,930,673 B2 | 8/2005 | Kaye et al. |
| 7,496,229 B2 | 2/2009 | Zhang et al. |
| 2002/0001029 A1 * | 1/2002 | Abe ............................ 348/49 |
| 2004/0150627 A1 | 8/2004 | Luman et al. |
| 2005/0078092 A1 | 4/2005 | Clapper |
| 2005/0180631 A1 | 8/2005 | Zhang et al. |
| 2006/0092178 A1 * | 5/2006 | Tanguay et al. ............. 345/629 |

OTHER PUBLICATIONS

Korea Patent Office Action dated Jan. 5, 2010.
Ballagas et al., "iStuff: A Physical User Interface Toolkit for Ubiquitous Computing Environments", ACM Digital Library, CHI 2003: New Horizons, Paper: Between U and I, vol. No. 5, Issue No. 1, Ft. Lauderdale Florida Apr. 5-10, 2003, pp. 537-544.
Stotts et al., "Face Space: Endo- and Exo-Spatial Hypermedia in the Transparent Video Facetop", ACM Digital Library, HT'04 Aug. 9-13, 2004, Santa Cruz, California, pp. 48-57.
Ishii et al., "Integration of Interpersonal Space and Shared Workspace: ClearBoard Design and Experiments", ACM Transactions on Information Systems, vol. 11, No. 4, Oct. 1993, pp. 349-375.

* cited by examiner

*Primary Examiner*—Amare Mengistu
*Assistant Examiner*—Koosha Sharifi
(74) *Attorney, Agent, or Firm*—Yee & Associates, P.C.; Steven L. Bennett (57) ABSTRACT

The computer implemented method, apparatus, and computer program product for capturing markup layers on a whiteboard in relation to a projected image. A presentation page is displayed on a whiteboard as the projected image. A set of markups on the whiteboard associated with the presentation page is identified. The set of markups on the whiteboard is isolated from the projected image of the presentation page to create a user input layer. The user input layer is saved as an overlay for the presentation page.

16 Claims, 7 Drawing Sheets

FIG. 9

RECOGNITION AND CAPTURE OF WHITEBOARD MARKUPS IN RELATION TO A PROJECTED IMAGE

BACKGROUND OF THE INVENTION

1. Field of the Invention

The present invention relates generally to an improved data processing system and, in particular, to an improved method, apparatus, and computer program product for capturing user input. In particular, the present invention is directed to a computer implemented method, apparatus, and computer program product for recognizing and capturing whiteboard markup layers in relation to a projected image.

2. Description of the Related Art

During conferences and meetings in which a presentation display is projected onto a whiteboard, a presenter will frequently make annotations or markups of the presentation by drawing on the whiteboard with a marker directly over the projected presentation. Mark-ups and annotations made onto the whiteboard by the presenter are visible to meeting attendees physically present in the conference room. However, if the meeting is also a teleconference, meeting attendees that are not physically present in the conference room are at a significant disadvantage because they may not be able to see the mark-ups being made by the presenter.

Attempts to solve this problem have included using a stand-alone camera to capture the presentation on video. However, the presentation can loose resolution and image quality due to camera limitations and environmental factors, such as room lighting conditions and objects and/or people obstructing the camera's view.

A projector can be used to display a presentation image from a computer that permits the image to be modified using traditional computer input devices, such as a mouse or keyboard. However, traditional input devices are not as natural or convenient for humans to use as a pen on a whiteboard.

Rather than using a mouse or keyboard, a digitizing tablet input device may be utilized. In a projected environment, however, digitizing tablets require a user to monitor the projected display while writing on the tablet. Moreover, tablet devices provide only a small input space. In addition, a digitizing tablet, keyboard or mouse must be shared by all users.

Electronic whiteboards permit more natural input from users. However, electronic whiteboards are also more costly, which limits widespread installation of these devices. Moreover, because electronic whiteboards are large, they are not easily moved or shared between users. In addition, the size of a projected image is limited to the size of the whiteboard itself.

BRIEF SUMMARY OF THE INVENTION

The aspects of the present invention provide a computer implemented method, apparatus, and computer program product for capturing markup layers on a whiteboard in relation to a projected image. A presentation page is displayed on a whiteboard as the projected image. A set of markups on the whiteboard associated with the presentation page is identified. The set of markups on the whiteboard is isolated from the projected image of the presentation page to create a user input layer. The user input layer is saved as an overlay for the presentation page.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
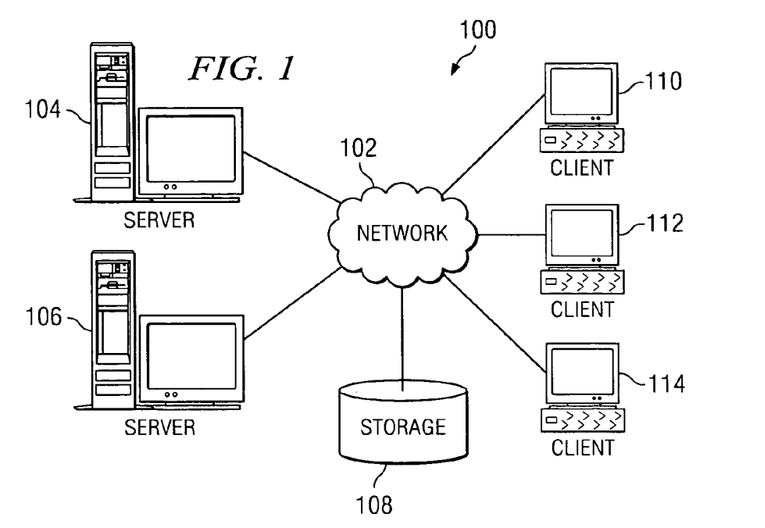
FIG. 1 is a pictorial representation of a network of data processing systems in which aspects of the present invention may be implemented.
Figure 2:
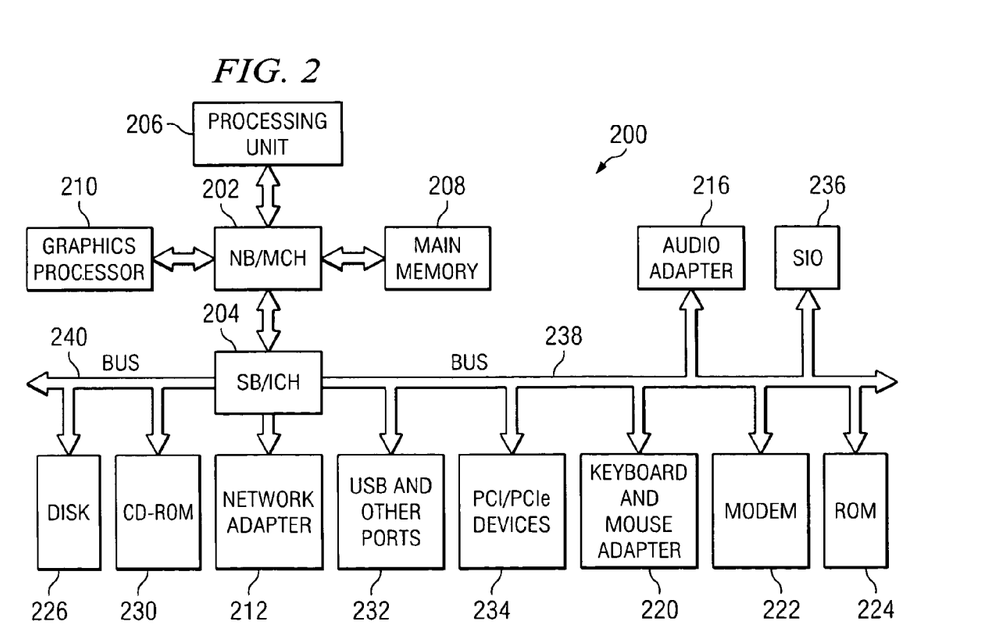
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

During conferences and meetings in which a presentation image is projected onto a whiteboard, a presenter will frequently make annotations or markups of the presentation by drawing on the whiteboard with a marker directly over the projected presentation. However, if the meeting is also a teleconference, meeting attendees that are not physically present in the conference room are at a significant disadvantage.

Attempts to solve this problem have included using a stand-alone camera to capture the presentation on video, using a computer mouse, keyboard, or digitizing tablet to enter input, or utilization of costly electronic whiteboards. However, the aspects of the present invention recognize that capturing input in these ways can place physical constraints on the presenter, limit the presentation image quality and resolution, and/or result in increased costs for users.

Generally, the most natural position for a presenter of a presentation is standing in front of a conference or meeting room and pointing or drawing directly over the projected image projected on a whiteboard. Thus, the aspects of the present invention recognizes a need exists for the capability to capture human input in the form of markups while permitting a more natural interaction with the projected image on a whiteboard, but without the additional cost and limitations of using electronic whiteboards.

In addition, unless captured human input is normalized in relation to the projected image, the captured input cannot be saved as an overlay to the projected image. Further, capturing the projected image and markup together does not permit a user to save and manage user input in a markup layer separately from the presentation page itself. Thus, aspects of the present invention also recognize a need exists for the ability to save multiple overlays of user markups such that each markup overlay can be tied to a specific page of a presentation. In addition, in a network environment that involves multiple users creating multiple overlays, each specific overlay can be tied to or associated with a specific user that made the markups in the specific overlay.

As used herein, a presentation page includes any type of pre-prepared drawings, figures, text, words, graphs, diagrams, charts, lines, or dots on a page, slide, or other format prepared for display by a projection device at a meeting or conference. A projection device, includes but is not limited to, a projector or other device capable of projecting an image onto a screen or whiteboard. An example of a presentation page includes, but is not limited to, a power point presentation page.

Therefore, the aspects of the present invention provide an improved computer implemented method, apparatus, and computer program product for recognizing and capturing whiteboard markup layers in relation to a projected image. Markup capture is a mechanism of the present invention that allows a user to draw directly on an ordinary, non-electronic whiteboard. A markup manager captures the markups using a camera and filter to isolate markups from the original presentation display.

Thus, as a user draws and erases during a presentation, the markup is captured by the markup manager in real time. As used herein, the term "markup" includes marks made on a whiteboard by a marker or writing implement of any type or color. For example, a marker could include, but is not limited to, a dry-erase type marker of any color.

Figure 3A:
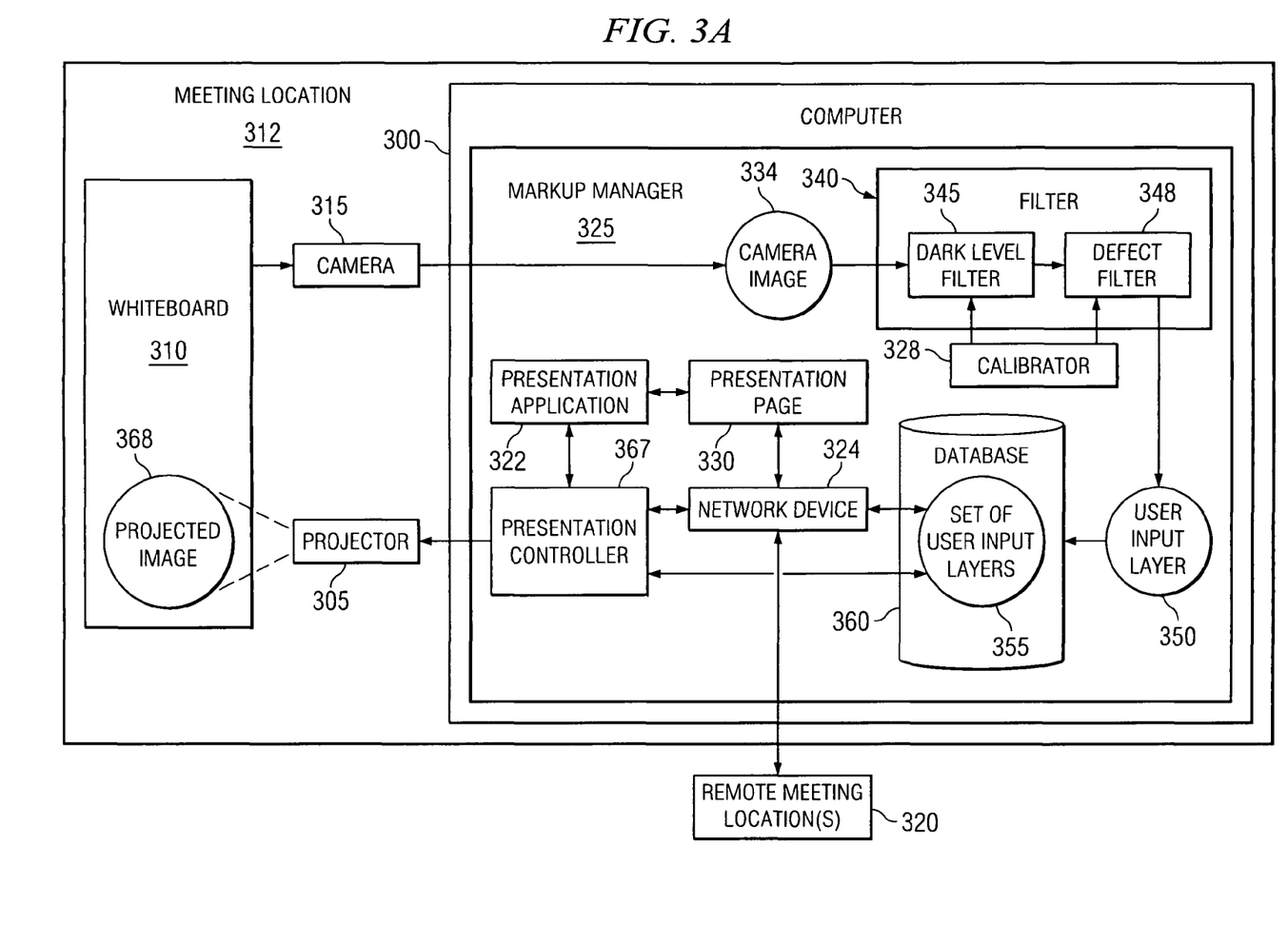
FIG. 3A is a block diagram illustrating a process for dark level filter capture of markups on a whiteboard in accordance with an illustrative embodiment of the present invention.

FIG. 3A is a block diagram illustrating a process for dark level filter capture of markups on a whiteboard as collaboration layers to complement a presentation document in accordance with an illustrative embodiment of the present invention. An active user utilizes computer 300 to capture and control whiteboard-based markup layers corresponding to one or more presentation pages displayed by projector 305 onto whiteboard 310. Computer 300 is any type of computing device, such as a personal computer, laptop, or any other computing device depicted in FIGS. 1 and 2.

Computer 300 is connected to any type of known or available projector capable of displaying a projected presentation display onto whiteboard 310, such as projector 305. Projector 305 projects an image onto a whiteboard, such as whiteboard 310, in a meeting room. In this illustrative example, whiteboard 310 is a standard, non-electronic whiteboard.

The initial active user is located at meeting location 312. In accordance with one embodiment of the present invention, a single presenter begins a presentation and assumes control of the presentation as the initial active user. Control of the presentation can be switched to another active user at any time during a presentation. As used herein, an active user is a presenter that is creating, capturing, controlling, and/or manipulating a whiteboard-based markup layer corresponding to a projected page at a meeting location, such as a conference room.

A camera, such as camera 315, is connected to computer 300 via a universal serial bus (USB), a FireWire port on computer 300, or any communications port on computer 300. A FireWire port is a port that follows the I.E.E.E. 1394 standard. In this illustrative example, computer 300 is also connected to remote meeting locations 320 through network device 324 that connects to a network connection, such as network 102 in FIG. 1.

Computer 300 can be connected through the network to other remote meeting locations with one or more other active users, remote meeting locations with one or more passive users, and/or to individual users not located at meeting location 312. In other words, a remote meeting location is any location separate or apart from a conference room or meeting location 312 where the current active user is physically located. As used herein, a remote meeting location includes a different room in the same building as the active user's meeting location 312, as well as a different building, city, state, or country as the current active user's meeting location 312. Users at remote meeting location(s) 320 have the same capabilities as users at meeting location 312. Remote meeting location(s) 312 do not require presentation application 322 because presentation application 322 always runs on the computer of the initial active user.

Presentation application 322 runs on the computer of the initial active user, even if control of the presentation is passed to one or more other active users. Control can be passed to another active user at the same physical location as the first active user at meeting location 312 or to another active user at one or more remote meeting location(s) 320.

In accordance with this illustrative embodiment of the present invention, the initial active user's computer is the only one running presentation application 322. Passive users receive the video output from the active user's computer from the network through network device 324. Passive users do not require a copy of presentation application 322 or the original presentation documents, such as presentation page(s) 330. As used herein, the term "passive user" refers to a user viewing a presentation display, either at the same location as one or more active users and/or at a remote location to one or more active users. A passive user passively views a presentation display presented by the active user. In addition, the passive user can merge existing overlays with the presentation for viewing by the passive user or hide overlays from view at the passive user's own computer display. However, the passive user does not create and capture new input layers or control the presentation viewed by any other active or passive user.

Markup manager 325 utilizes calibrator 328 to normalize a markup image received from camera 315 and to calibrate filter 340. Calibrator 328 performs calibration functions prior to beginning a presentation display. Calibrator 328 performs an orthogonality calibration to enable markup manager 325 to recognize which part of a markup image received from camera 315 is the whiteboard image. This calibration also enables markup manager 325 to make adjustments for oblique angles of the projection.

Calibrator 328 performs a dark level calibration to calibrate filter 340. This calibration is performed to accurately distinguish between markups created by a user upon whiteboard 310 and images projected onto whiteboard 310, such as a user using a black marker and the darkest black projected by projector 305. The black marker markup will be darker than the black projected by projector 305. Based upon this determination, calibrator 328 sets a clip level that allows filter 340 to differentiate user created black markups on whiteboard 310 from a projected image projected by projector 305. So if, for example, the white value of a black markup pixel is five (5) out of 255, while the darkest black that can be produced by the projector has a white value of twenty-one (21), the clip logic will be set to a clip level of between five (5) and twenty-one (21). Assuming the midpoint value [(5+21)/2=13] was used for the clip level, then pixels in the camera image with a white value below thirteen (13) would be considered part of the markup layer.

Calibrator 328 also calibrates defect filter 348 to enable filter 340 to ignore defects in a whiteboard surface on whiteboard 310 that might otherwise appear to be user markups. Defects could include scratches, seams, and set-in stains and marks that cannot be erased.

Calibrator 328 calibrates defect filter 348 by projecting a white image onto cleaned whiteboard 310. Calibrator 328 applies a clip level determined during the dark level calibration to identify any defects in whiteboard 310 that could be falsely interpreted as a markup. This information is saved in filter 340 for use by defect filter 348. Defect filter 348 filters marks from markup images received from camera 315 that are likely due to defective areas on whiteboard 310. Marks identified as defects are not included in user input layer 350. Instead, defect marks are simply ignored.

In the illustrative example shown in FIG. 3A, a presenter opens a presentation application 322 on computer 300 for display by projector 305 onto whiteboard 310. The presentation is opened from within markup manager 325. Markup manager 325 places the presentation in presentation mode by interfacing with a presentation controller 367. The presentation controller 367 combines the video content from the presentation application 322 with the user input layers 355. The initial active user creates the video content from presentation application 322. The video content from the presentation content is shared with all active and passive users at meeting location 320 or any remote meeting locations 322. Presentation application 322 can be any known or available presentation format for use on computer 300, including, but not limited to, PowerPoint and Freelance Graphics.

The presenter initiates display of presentation page 330 of the presentation session. Presentation controller 367 displays the current presentation page and selected user input layers on computer 300 full view screen or active window. The presentation is controlled within presentation controller 367 so that when, for example, a user transitions from one presentation page to a different presentation page, presentation controller 367 can recognize that a different presentation page in the presentation is being viewed and can overlay with the associated input layers. A user can transition from one presentation page to a different presentation page, for example, by pressing a page up control to transition to the next page or pressing a page down control to transition to a previous page.

Presentation page 330 and selected user input layers are merged by presentation controller 367 and transmitted to projector 305 for display on whiteboard 310. Camera 315 records an image of the projected image 368 displayed on the whiteboard to form camera image 334. Camera image 334 is a picture of projected image 368 together with markups made on whiteboard 310 by one or more users. The series of black marks on whiteboard 310 form black markup layer. Thus, camera image 334 comprises projected image 368 and a black markup layer.

Filter 340 filters camera image 334 using defect filter 348 to eliminate marks in the image caused by defects in whiteboard 310. Filter 340 utilizes dark level filter 345 to isolate black markup layer from presentation page 330 based upon a difference in brightness level of the black markups and the projected black.

In other words, dark level filter 345 separates black markup layer from the original presentation page 330 by determining a black level of the black markup layer relative to a black level of the projected image 368 to form a user input layer. The black markup layer will be a darker black. Thus, the black markup layer can be isolated and saved to form user input layer 350. User input layer includes only the markups and human input created by user at whiteboard 310. User input layer 350 does not include any content from original presentation display projected by projector 305.

User input layer 350 is saved in set of user input layers 355 in database 360. Set of user input layers 355 comprises one or more user input layers associated with a specified presentation page in a plurality of presentation pages for a presentation.

Set of user input layers 355 is linked to presentation pages 330. In accordance with an embodiment of the present invention, each presentation page is assigned a page identifier. When user input layer 350 is stored within set of user input layers 355 in database 360, a page identifier for presentation page 330 is stored in database 360 with set of user input layers 355 identifying presentation page 330 as the page to which set of user input layers 355 is linked.

In this manner, set of user input layers 355 is associated with a specified presentation page in a plurality of presentation pages within a given presentation. Moreover, a different set of input layers can be stored in database 360 in association with each different presentation page in the plurality of presentation pages in a given presentation.

Presentation page 330 and a set of user input layers 355 are transmitted to a set of remote meeting locations. A set of remote meeting locations comprises one or more remote meeting locations, such as remote meeting locations 320 via a network using any known or available conferencing applications, such as Windows® Net Meeting and WebEx Web Conferencing. Active user(s) can transmit one or more user input layers associated with presentation page 330 to remote meeting location 320 for display of user input layers as overlays to presentation page 330.

In accordance with this illustrative example, set of user input layers 355 and presentation page 330 are transmitted dynamically over the network to remote meeting location 320. However, presentation page 330 is transmitted separately from set of user input layers 355 to allow for other active users to switch the user input layers being displayed as overlays to presentation page 330.

Control of markup capture can be transferred to a second active user at remote meeting location 320. Moreover, in accordance with another illustrative embodiment, multiple active users can capture real-time markups simultaneously. In such a case, presentation controller 367 dynamically incorporates each different active user's markups into presentation page 330 for display in real-time. Thus, multiple secondary active users can create user input layers simultaneously.

Multiple active user input layers can be created, captured, and saved in association with presentation page 330, either in real-time or at staggered times, in addition to set of user input layers 355 generated by a primary active user utilizing computer 300. The additional user input layers associated with presentation page created by a second active user or multiple other secondary active users can be transmitted back to computer 300.

Additional other active users at the same location or at other remote locations can create, capture, save, and transmit other user input layers associated with presentation page 330. In addition, user input layers can be created and captured for other presentation pages in the plurality of presentation pages in the given presentation in the same manner as is described above with regard to presentation page 330.

Figure 6:
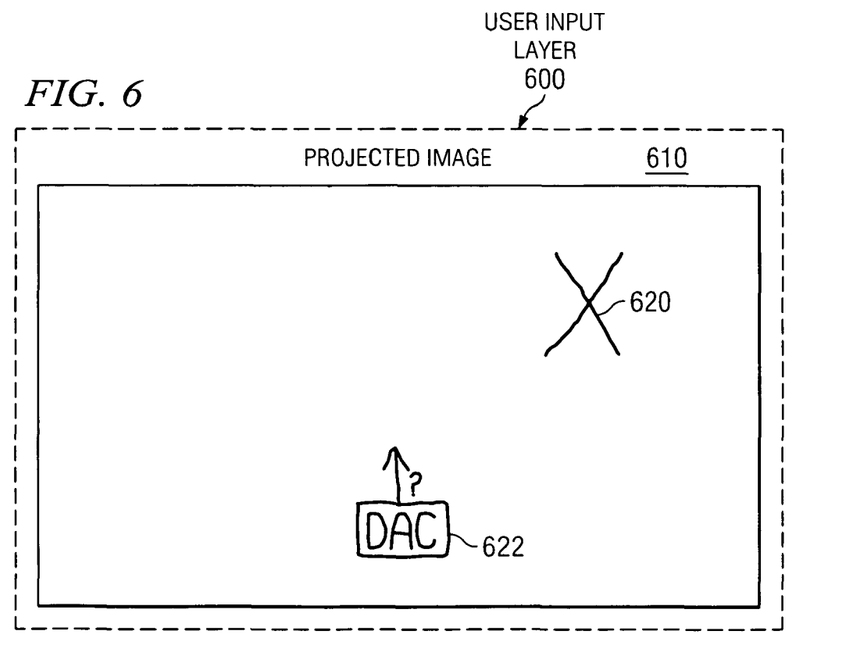
FIG. 6 is a block diagram illustrating a user input layer isolated from a markup image in accordance with an illustrative embodiment of the present invention.

Presentation controller 367 processes one or more user input layers in set of user input layers 355 for display as an overlay in conjunction with one or more presentation pages. As used herein, an overlay is user input layer 350 contents, such as is shown in FIG. 6, that can be overlaid on top of, incorporated into, or otherwise displayed in conjunction with the original presentation page or any other presentation page. In addition, an overlay can be merged with a presentation page in conjunction with one or more other overlays, just as transparencies can be stacked on top of one another in such a way that the graphics/text on each transparency is visible simultaneously in an overlapping fashion.

For example, if a presentation page is a bar graph showing revenues for 2004 to 2005 and an active user makes a markup to the graph adding revenues projected for 2006, the 2006 revenues markup can be captured as user input layer 350 and stored in database 360. If an active user selects to display user input layer 350 showing projected revenues for 2006 in conjunction with any presentation page, presentation controller 367 retrieves user input layer 350 and transmits user input layer as an overlay to projector for display in conjunction with displayed presentation page 330. In accordance with this illustrative embodiment, presentation application 322 is a separate component from presentation controller 367. However, in accordance with another embodiment of the present invention, presentation application 322 and presentation controller 367 are embodied within a single component.

In accordance with an illustrative example, each user input layer in set of user input layers 355 stored in database 360 can be assigned a unique color, such that each user input layer is a different color from every other user input layer when displayed as an overlay by projector or on any computer and/or digital display. Each user input layer can be assigned a unique color based upon the user that created the input layer and/or the meeting location.

In another embodiment of the present invention, each saved user input layer in set of user input layers 355 can be assigned to a different function key. Thus, a user can select to display a particular user input layer by pressing the function key associated with that user input layer. The function key can be pressed again to remove the overlay associated with the function from display in conjunction with presentation page 330. However, the embodiments of the present invention are not limited to selecting user input layers by selecting function keys. For example, a user input layer can be selected by a user in accordance with the embodiments of the present invention utilizing any known or available methods for selecting data in a database, including, but not limited to, selecting or clicking on an icon on a graphical user interface or selecting a menu item on a menu driven interface.

In another exemplary embodiment of the present invention, one or more user input layers can be displayed simultaneously as overlays to presentation page by pressing a function key assigned to each user input layer to be displayed. In an example in which multiple user input layers are displayed simultaneously, the user input layers are displayed as overlays in a stacked fashion, such that multiple overlays are visible simultaneously. In an illustrative example, each user input layer can be displayed in a different color, such that each overlay is distinguishable from every other overlay in the stack based upon the color of the user input layer.

In accordance with the aspects of the present invention, a user input layer can be displayed as an overlay to presentation page 330 in collaboration with multiple other overlays. In such a case, a user selects a set of user input layers 355 to display as overlays to presentation page 330. Each selected user input layer is overlaid on the projected image of presentation page in the active user's meeting location as well as on all other remote meeting locations, such as remote meeting location 320.

Likewise, one or more user input layers in set of user input layers 355 can be hidden from display such that only certain user input layers are displayed as overlays and one or more hidden user input layers are not displayed in conjunction with presentation page 330. Thus, a user input layer can be hidden from display with presentation page 330 or deleted from set of user input layers 355 in database 360.

In an illustrative embodiment, database can store presentation page 330 in conjunction with one or more overlays as a modified presentation page. Thus, presentation page 330 can be saved in database 360 as multiple different modified versions of presentation page 330 in which one or more different overlays are incorporated into each different version of the modified presentation page.

In an alternative illustrative embodiment, camera 315 and projector 305 are embodied within a single unit, such that camera 315 is a component within projector 305.

In an illustrative example in which all users at a meeting location are passive users, computer 300 is connected to one or more master conference locations though a network, such as network 102 in FIG. 1. A master conference location is a meeting location, such as meeting location 320, at which one or more active users are located. In such a case, computer 300 is optionally connected to projector 305 and camera 315.

In another exemplary embodiment of the present invention, an active user creates and stores one or more user input layers associated with a presentation page in database 360 without transmitting input layers to remote meeting locations 320. User input layers can be viewed and/or manipulated by one or more users after the conference or meeting has concluded, rather than in real time during the meeting. In such a case, computer is optionally connected to remote meeting locations 320 via a network.

In another embodiment of the present invention, an active user must sign-on or log-on to markup manager 325 on computer 300 with a user name in order to initiate a markup capture of a markup layer associated with a presentation page. A user name could be a name associated with the active user or with the active user's conference location.

In another exemplary embodiment of the present invention, a playback and print facility is provided by computer 300. The playback and print facility permits a passive user to view overlays associated with a particular presentation page at a later point in time, such as after a conference has concluded. The playback and print feature permits the active user to update a presentation page to include one or more user input layers as a part of presentation page 330 rather than only as an overlay to presentation page 330. Thus, a user can update presentation page 330 to contain content from one or more user input layers such that the presentation page reflects changes made during the course of a presentation as markups to presentation page 330.

Figure 3B:
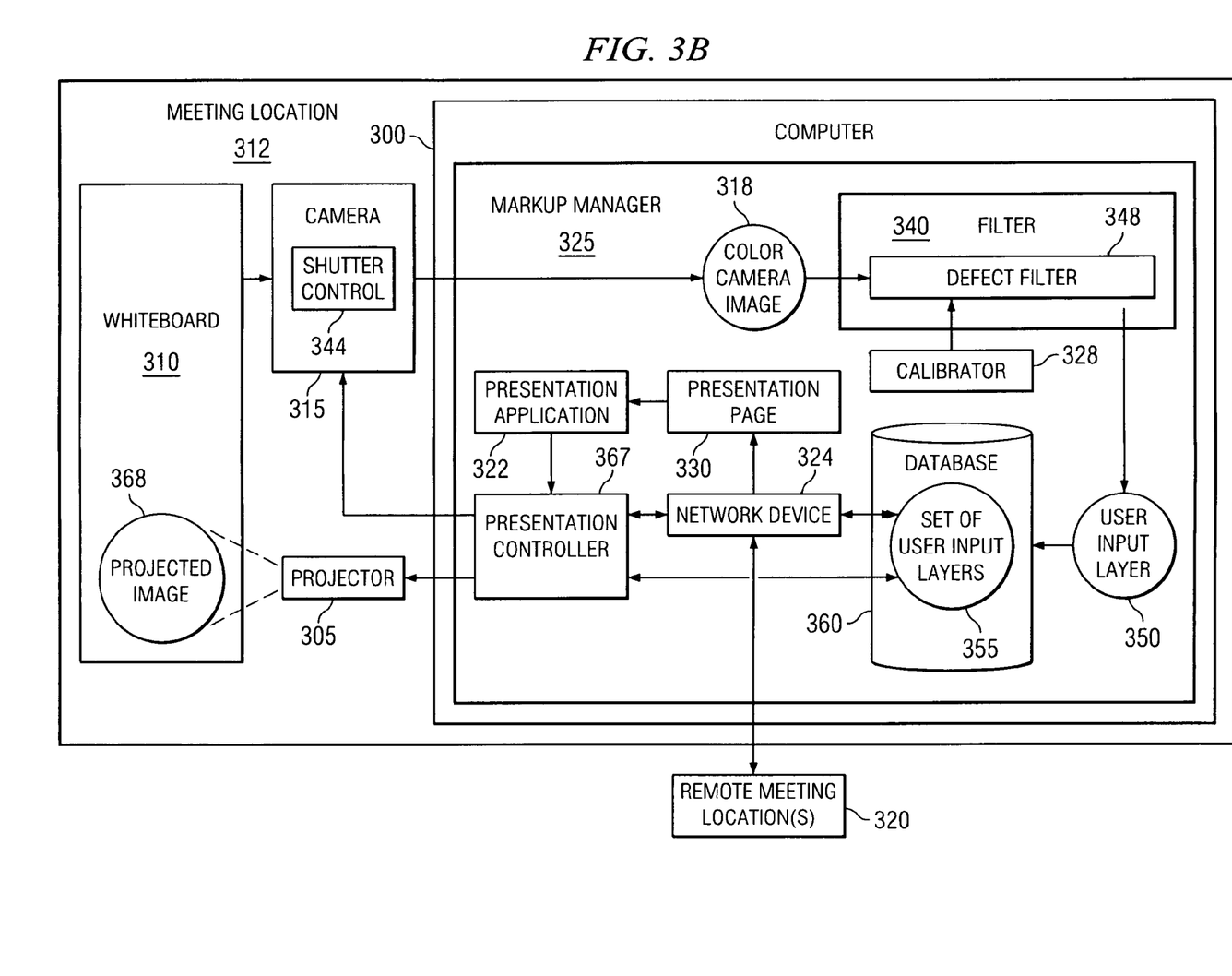
FIG. 3B is a block diagram illustrating the process of a white/gray strobe capture of markups on a whiteboard in accordance with an illustrative embodiment of the present invention.

FIG. 3B is a block diagram illustrating an alternative process of a white/gray strobe capture of markups on a whiteboard in accordance with an illustrative embodiment of the present invention. An active user utilizes computer 300 to capture and control whiteboard-based markup layers corresponding to pages displayed by projector 305 onto whiteboard 310 at meeting location 312. In this illustrative example, computer 300 is also connected to remote meeting locations 320 through network device 324 that connects to a network connection, such as network 102 in FIG. 1.

A user creates markups on whiteboard 310 using a marker, marking pen, or writing implement of any arbitrary color. Camera 315 is a color camera. Camera 315 captures an image of markups on whiteboard 310 to form color camera image 318. Color camera image 318 is an image of user markups made on whiteboard 310 without presentation page 330 projected onto whiteboard. Thus, color camera image 318 is an image of markups on whiteboard 310 without projected image 368 projected on whiteboard 310.

In order to capture color camera image 318, camera takes a picture of markups on whiteboard 310 during an interval in which projected displays a white background rather than presentation page 330. Presentation controller 367 coordinates a periodic interval in which the projected image is blanked out and replaced by a projected background. The projected background can be any light color to illuminate markups on whiteboard 310. For example, the projected background can be a pure white background, an off-white background, a light gray background, or any other light colored background to illuminate the markup layer. Camera 315 opens a shutter associated with camera 315 to capture an image of markups on whiteboard 310 illuminated by the projected white/gray background to create color markup layer 318 during the interval in which presentation page 330 is blanked and the white/gray background is displayed by presentation controller 367.

Presentation controller 367 coordinates a timing control sequence composed of sending a white/gray background image to projector 305 and a snapshot signal to camera 315 to initiate opening of the camera shutter of camera 315 to capture a color camera image 318. Shutter control 344 controls the timing relationships between the blanking signal sent to the projector and the opening of the camera shutter and shutter speed required for proper exposure of the markups. After color markup layer 318 has been captured, the projector replaces the projected white/gray background with the projected image of presentation page 330.

Markup manager 325 utilizes calibrator 328 to normalize an image of user markups, such as color camera image 318, received from camera 315, as well as to calibrate filter 340. Defect filter 348 removes marks in color camera image 318 due to defects in the surface of whiteboard 310. In this manner, user input layer 350 is formed from user markups made in any arbitrary color on whiteboard 310.

User input layer 350 is saved in set of user input layers 355 in database 360. Set of user input layers 355 comprises one or more user input layers associated with a specified presentation page in a plurality of presentation pages. Presentation controller 367 retrieves user input layer 350 to create an overlay for display in conjunction with presentation page 330.

In accordance with this illustrative embodiment, set of user input layers 355 and presentation page 330 are transmitted dynamically over the network to one or more remote meeting location(s) 320.

In an alternative embodiment, shutter control 344 can be eliminated from camera 315 and embodied within markup manager 325. In this embodiment, camera 315 continuously sends a camera image to markup manager 325. Markup manager 325 selects camera image frames which correspond with the interval during the strobe of the white/gray pulse from projector 305. Markup manager 325 disregards camera image frames captured outside of the white/gray pulse interval when presentation page 330 is displayed on whiteboard 310 by projector 305.

Figure 4A:
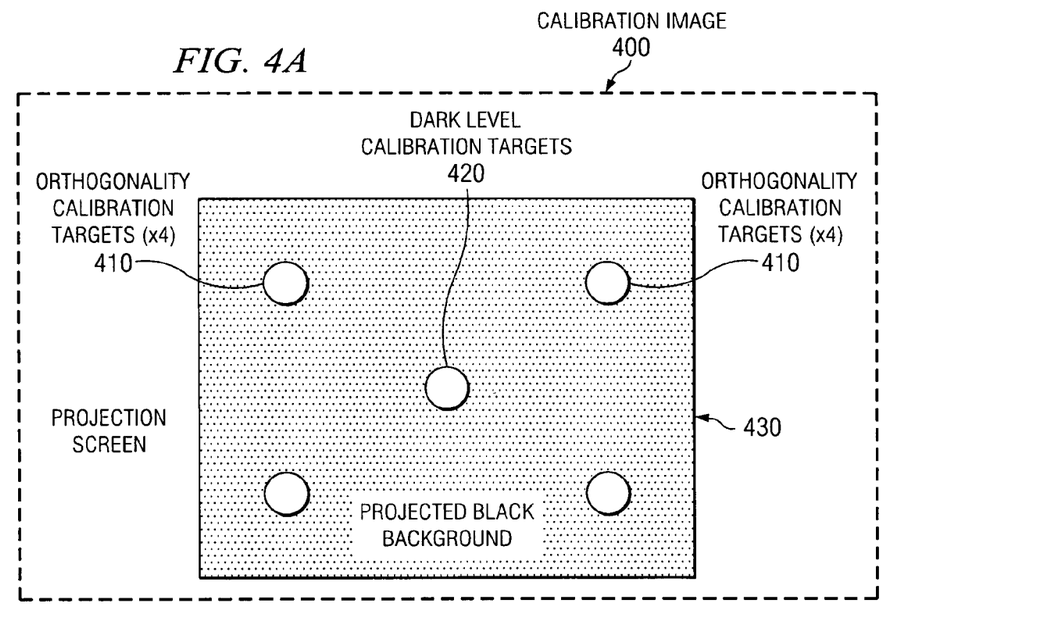
FIG. 4A is a block diagram illustrating a calibration image in accordance with an illustrative embodiment of the present invention.

FIG. 4A is a block diagram illustrating a calibration image in accordance with an illustrative embodiment of the present invention. Calibration of a markup image is performed by calibrator 328 in FIG. 3A in this illustrative embodiment.

Calibrator performs dark level calibration so that the filter can distinguish between black markup content and the presentation page in a markup image received from the camera. The calibrator takes advantage of the fact that a distinct difference in brightness level exists between the darkest black of a projected black background and the darkest black of a black markup on a whiteboard. The black marker onto the whiteboard will be darker than a projected black color of the projected image.

Calibrator also performs an orthogonality/region calibration to enable the markup manager, such as markup manager 325 in FIG. 3A, to recognize which portion of a markup image received from the camera in the active display image on the whiteboard image. Orthogonality calibration also enables the markup manager to make adjustments for oblique angles of projection. Orthogonality/region calibration is accomplished by projecting a nearly full screen black background 430 of calibration image 400 with white targets 410 in each corner. The calibrator is able to determine the whiteboard size and right angles of the whiteboard relative to a projected image so that all marks within a markup image received from the camera can be merged at the correct pixel location corresponding to the projected image of the presentation page.

Calibration image 400 is displayed on a whiteboard. Calibration image 400 includes a white target referred to as a dark level calibration target 420 located on a projected black background of calibration image. A user colors in the target area of calibration target 420 as shown in FIG. 4B.

Figure 4B:
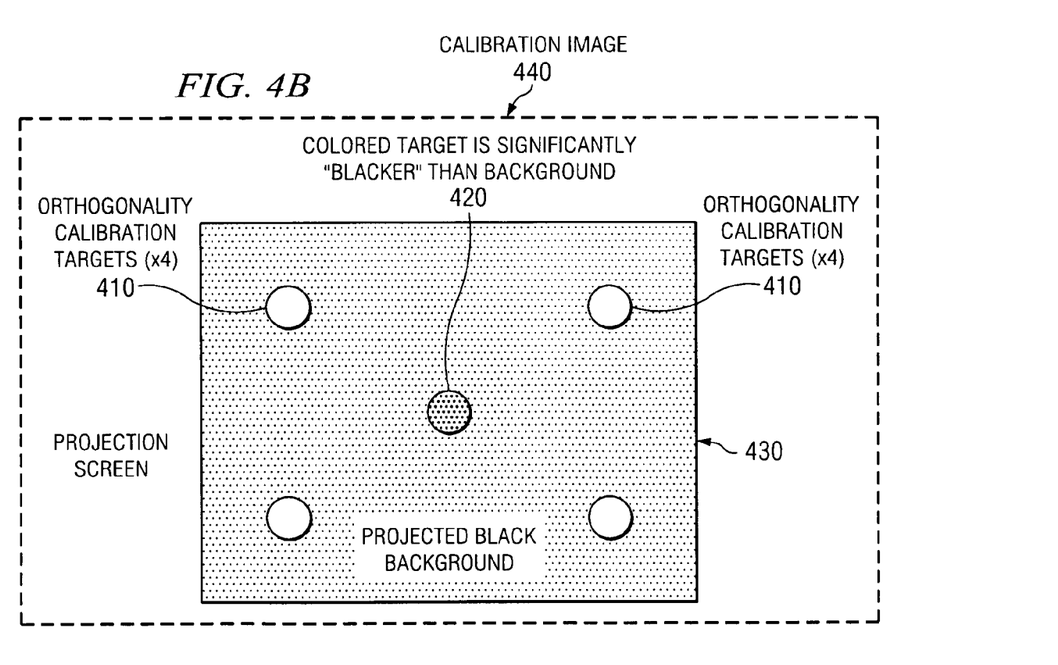
FIG. 4B is a block diagram illustrating the calibration image with a dark level calibration target area in accordance with an illustrative embodiment of the present invention.

FIG. 4B is another exemplary block diagram illustrating the calibration image with a dark level calibration target area in accordance with an illustrative embodiment of the present invention. Calibration image 440 target 420 is colored in with a black marker. The target area can be colored in with any type of black marking pen or black marker, such as a standard black dry erase marker. A camera captures a markup image of the whiteboard with the projected black background and transmits the image to the calibrator.

The calibrator analyzes the markup image received from the camera and compares the brightness level of the projected black background relative to the black marker on target location 420 to establish a clip level. Once established, the clip level allows the system to differentiate the black markup content made by the black marker or black marking pen from the image projected by the projector or any other displayed video content.

Figure 5:
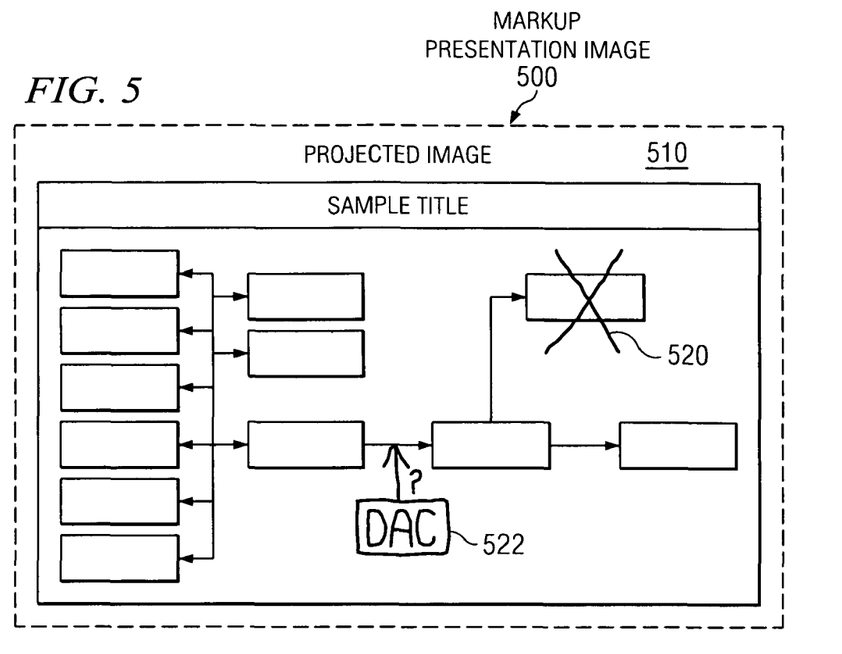
FIG. 5 is a block diagram illustrating a markup image received by markup manager in accordance with an illustrative embodiment of the present invention.

FIG. 5 depicts a block diagram illustrating a markup image received by markup manager in accordance with an illustrative embodiment of the present invention. Markup presentation image 500 is a picture taken by a camera of a whiteboard with a projected image 510 and markups 520 and 522 created by one or more users drawing onto the whiteboard in association with the projected image.

FIG. 6 depicts a block diagram illustrating a user input layer 600 isolated from markup image 500 in FIG. 5 in accordance with an illustrative embodiment of the present invention. User input layer 600 is saved as an overlay to the projected image 610. Natural human input in the form of markups 620 and 622 are captured as a separate user input layer 600.

Figure 7:
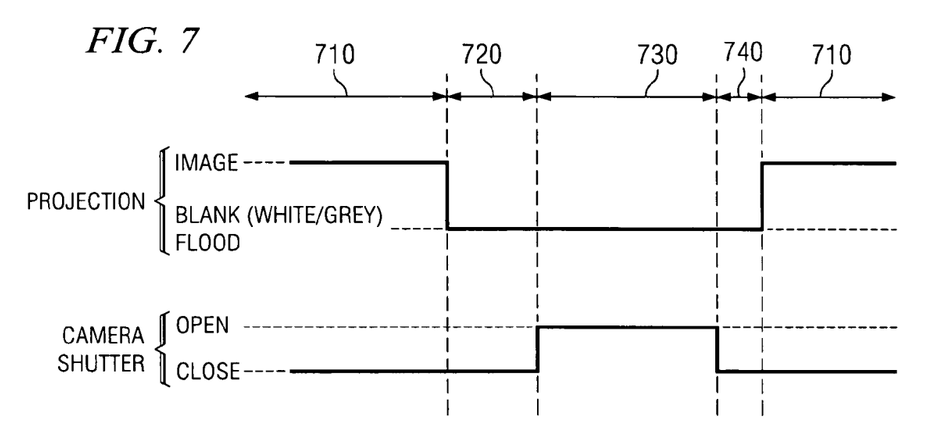
FIG. 7 is a graph illustrating the white/gray strobe capture process to isolate a color markup layer in accordance with an illustrative embodiment of the present invention.

FIG. 7 is a graph illustrating the white/gray strobe capture process to isolate a color markup layer in accordance with an illustrative embodiment of the present invention. During the majority of the time, the camera is inactive and a presentation page in a presentation is displayed onto the whiteboard such as at time periods 710 and 712. During this period, normal presentation content is projected by the projector.

At time period 720, the projection is transitioned from displaying normal presentation matter to displaying a pure white background. This transition can occur at a specific schedule. For example, the normal presentation matter can be transitioned to the white/gray light every five (5) seconds.

At time period 730 a pure white or gray screen or background is projected by projector and the camera shutter is held open to capture markup data in the color markup layer. Because presentation page is not projected by projector, the markup data captured by the camera does not include any of the normal presentation matter associated with the color markup layer.

Time period 740 occurs after the camera shutter has closed but before the white background is replaced by the normal presentation data on the projected display. This interval of time occurs to ensure that the camera shutter is not still open when the presentation image is displayed onto the whiteboard again during time period 712.

In this illustrative example, the process of blanking the projector image and opening a camera shutter to capture a color markup layer occurs at regular intervals in order to capture a constant stream of real time markup updates.

In another alternative, a shutter control transition occurs only when a user selects to capture a color markup layer, such as in a snapshot mode. In a snapshot mode, the camera only captures an image of the whiteboard wherein a user selects a control to cause the blanking interval to occur. A user selects the blanking interval control each time the user wants to capture an image of markups on the whiteboard.

The snapshot mode can reduce flicker problems that may occur during a constant duty cycle of screen blanking in a real time markup capture of markups at regular intervals. In addition, a user can utilize the snapshot mode where a final markup of a presentation page is only needed once all markups are complete. For example, if the final markup version will be merged into an updated version of the presentation page at the end of the presentation, a markup capture need only occur once after all markups are complete.

In another illustrative embodiment, a shutter control controls the timing relationships between the blanking signal sent to the projector and the opening of the camera shutter and shutter speed required for proper exposure of the markups. The shutter control is calibrated to adjust the operating parameters of the projector and camera so that the data capture is optimized. The calibration also minimizes flickering that occurs during the blanking intervals.

The markup capture intervals at 720, 730, and 740 are calibrated as follows:

System projects test pattern that covers the entire screen area, using a fine grid of horizontal and vertical lines. The system then captures this as a reference image.

The system adjusts interval 720, which is the time period between turning off the displayed image and starting the image capture, until the smallest time is found where no residual test pattern luminance appears in the captured image.

User is prompted to draw a large "X" from corner to corner on the whiteboard.

The system projects pure white to illuminate the "X" and then the system adjusts the camera shutter time at interval 730 until the minimum value is found to accurately capture the "X".

The performs the actions of interval 720 and interval 730, and adjusts interval 740 (time between signaling a shutter close and representing the grid), until the minimum value for interval 740 is found Now the minimum timing to allow markup capture. The system then finds the minimum time that the shutter must stay open in order to capture the "X" at interval 730.

Now the minimum timing for capturing the markup data is known. The final calibration step determines the maximum time of normal projection 710 that is required to minimize flickering yet permit the desired markup capture rate. In one illustrative embodiment, the final calibration is a manual setting where the operator is allowed, though a setup interface, to adjust timing 710 to the point where flickering is longer noticeable. Thus the fastest markup capture rate is obtained while preventing or at least minimizing visual disturbances caused by the markup image capture.

Figure 8:
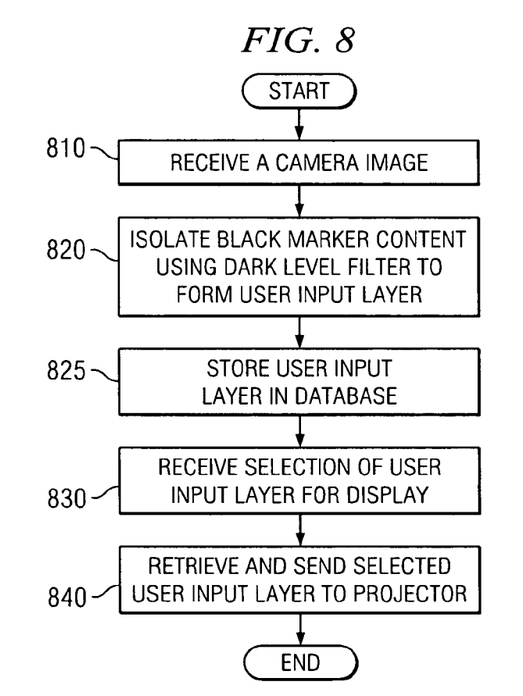
FIG. 8 is a flowchart illustrating the process of dark level filter capture of markups on a whiteboard in accordance with an illustrative embodiment of the present invention.

FIG. 8 is a flowchart illustrating the process of dark level filter capture of markups on a whiteboard in accordance with an illustrative embodiment of the present invention. The process is performed by a presentation software component, such as markup manager 325 in FIG. 3A.

The process receives a camera image from a camera (step 810). The camera image is an image of a presentation page displayed on a whiteboard with markups. The process isolates a black markup content using a dark level filter to form a user input layer (820). If a user input is not greater than a clip level, the input is ignored. The user input layer is stored in database (step 825).

The process receives a user selection of a user input layer for display in conjunction with a presentation page (step 830). The process retrieves the selected user input layer from a database and sends the user input layer to a projector for display as an overlay to the presentation page (step 840) with the process terminating thereafter.

In accordance with an exemplary embodiment of the present invention, if one or more other overlays are already being displayed as overlays to presentation page, the user input layer can be displayed as an additional collaboration layer in conjunction with the other overlays. In this illustrative example, each overlay is displayed in a different color to distinguish between the various different overlays.

Figure 9:
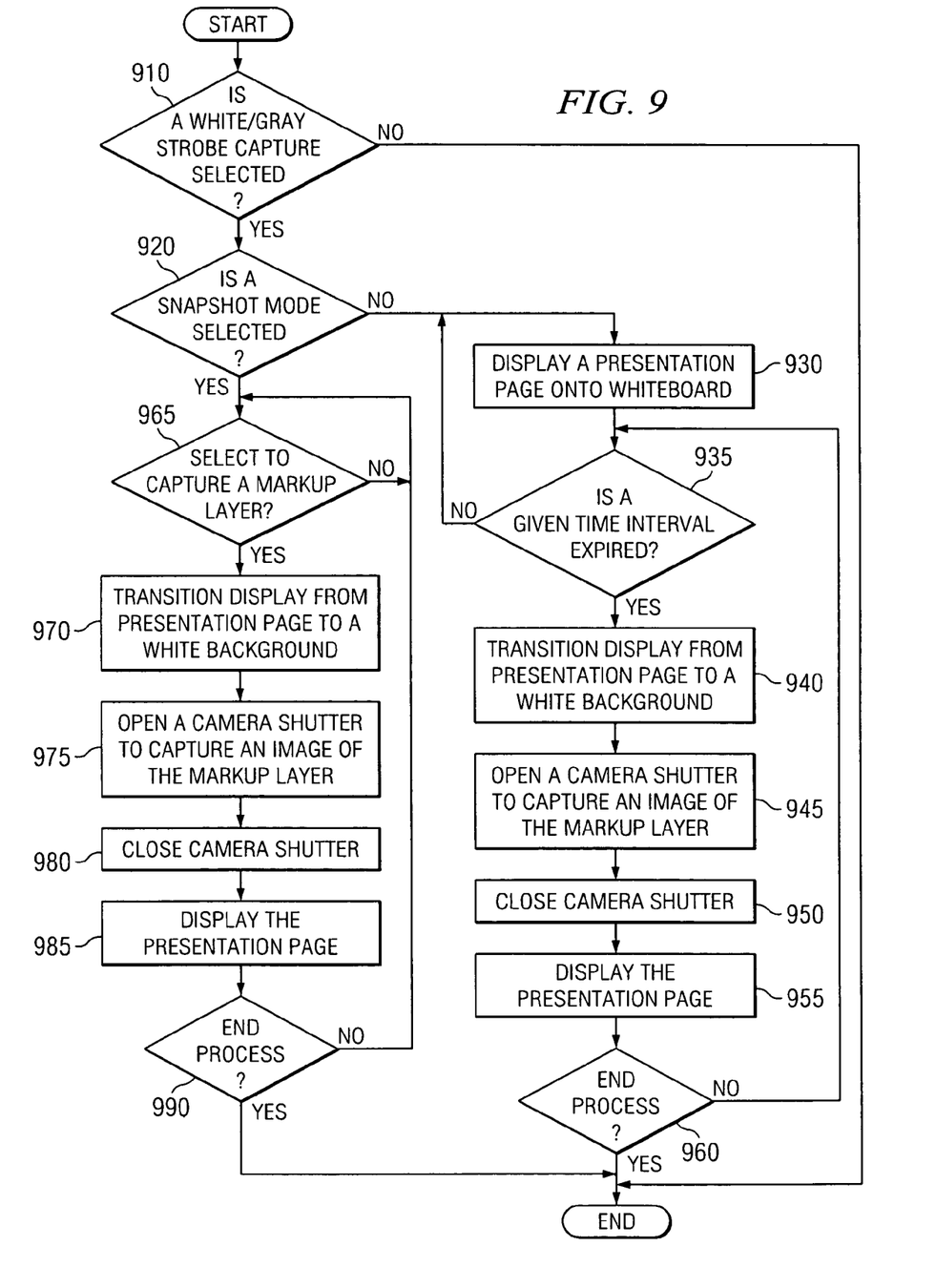
FIG. 9 is a flowchart illustrating the process of white/gray strobe capture of markups on a whiteboard in accordance with an illustrative embodiment of the present invention.

FIG. 9 is a flowchart illustrating the process of white/gray strobe capture of markups on a whiteboard in accordance with an illustrative embodiment of the present invention. The process is implemented by a presentation software component, such as markup manager 325 in FIG. 3B.

The process begins by determining whether a white/gray strobe capture has been selected (step 910). If the white/gray strobe capture has not been selected, the process terminates.

If the white/gray strobe capture has been selected, the process determines if a snapshot mode is selected (step 920). If a snapshot mode is not selected, the process displays a presentation page onto a whiteboard (step 930). The process then determines if a given time interval has expired (step 930). If the given interval of time has not expired, the process returns to step 930. If the given interval has expired, the process initiates a transition of the projected display of the presentation page to a projected display of a white background (step 940).

Next, the process opens a camera shutter to capture an image of the markup layer on the whiteboard while the white background is projected on the whiteboard (step 945). The process closes the camera shutter (step 950) and reinitiates display of the presentation page (step 955).

If the process determines that a user has not selected to end the process, the process returns to step 935 to await the expiration of the given time interval, at which time the process will continue to capture a next markup layer.

Returning now to step 920, if a user has selected a snapshot mode, the process determines if a user has selected to capture a markup layer (step 965). If the user has not selected to capture a markup layer, the process returns to step 920 until a user chooses to capture a markup layer.

If the user has selected to capture a markup layer, the process initiates a transition of the projected display of presentation page to a projected display of a white background (step 970). The process opens a camera shutter to capture an image of the markup layer (step 975). Next, the process closes the camera shutter (step 980) and initiates display of the presentation page (step 990) by the projector.

Finally, the process determines if a user has selected to end the process (step 990). If a user not selected to end the process, the process returns to step 965 until a user selects to capture a next markup layer. If a determination is made that a user has selected to end the process, the process terminates thereafter.

Thus, the aspects of the present invention provide a method for capturing handwriting and other free-from natural human input made by marking on a standard, non-electronic whiteboard, without the expense of purchasing costly pens, digitizing tablets, electronic whiteboards, and/or sensors. In addition, this method, apparatus, and computer program product permit more natural human interaction with a projected image on a whiteboard. Moreover, the presently claimed invention operates using existing, commonly used display projection equipment, cameras, and computers.

In accordance with the illustrative embodiments of the present invention, user markups made on a whiteboard can be merged with presentation content without distortion or losses to the content. In addition, multiple users, located in the same physical location or geographically separated, are enabled to interactively collaborate by creating, viewing, and manipulating multiple user input layers associated with a specified presentation page.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or non-transitory computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for capturing markup layers on a whiteboard in relation to a projected image, the computer implemented method comprising:

displaying a presentation page as the projected image on a whiteboard;

identifying a set of markups on the whiteboard associated with the presentation page;

isolating the set of markups from the presentation page to create a user input layer, wherein the user input layer is saved as an overlay for the presentation page;

wherein the set of markups is a series of black marks forming a black markup layer, and wherein the step of isolating the set of markups further includes:

capturing an image of the presentation page and the black markup layer on the whiteboard;

isolating the black markup layer from the presentation page based upon a differentiation of a first black level of the black markup layer relative to a second black level of the presentation page to form a user input layer;

projecting a calibration image onto the whiteboard, wherein the calibration image comprises a white target area on a black background;

filling in the white target with a black marker; and comparing a black level of the black marker in the target area with a black level of a projected black background on the whiteboard to establish a clip level.

2. The computer implemented method of claim 1 wherein the set of markups is a series of marks of an arbitrary color forming a color markup layer on the whiteboard, and wherein the step of isolating the set of markups further comprises:

replacing the projected image of the presentation page with a projected background to illuminate the color markup layer, wherein the projected background is a white or gray background;

capturing an image of the color markup layer on the whiteboard to form a user input layer; and replacing the projected background with the projected image of the presentation page after the color markup layer is captured.

3. The computer implemented method of claim 1 further comprising:
transmitting a set of user input layers associated with the presentation page to a set of remote meeting locations.

4. The computer implemented method of claim 1 wherein a set of user input layers associated with the presentation page is stored in a database, and wherein each user input layer is assigned a different color.

5. The computer implemented method of claim 1 wherein the set of markups on the whiteboard associated with the presentation page are created by a first active user that controls a markup capture, and further comprising:
transferring control of the markup capture to a second active user at a remote meeting location, wherein one or more additional user input layers are captured in association with the presentation page.

6. The computer implemented method of claim 1 further comprising:
updating the presentation page, wherein the updated presentation page includes a content from one or more user input layers.

7. The computer implemented method of claim 1 further comprising:
utilizing the clip level to isolate the black markup layer from the presentation page.

8. The computer implemented method of claim 7 further comprising:
calibrating a defect filter, wherein defect filter filters marks from a markup image received from a camera that is due to a defect in a whiteboard surface.

9. The computer implemented method of claim 2 wherein the step of capturing an image of the color markup layer on the whiteboard to form a user input layer is performed by an electronic camera built into a projector.

10. The computer implemented method of claim 2 wherein a shutter control coordinates the blanking of the projected image of the presentation page and capture of the image of the color markup layer on the whiteboard.

11. The computer implemented method of claim 1 further comprising:
performing an orthogonality/region calibration to determine which portion of a markup image received from a camera is within an active display image on the whiteboard.

12. A computer program product comprising:
a non-transitory computer readable medium having computer usable program code for capturing markup layers on a whiteboard in relation to a projected image, the computer program product comprising:
computer usable program code for displaying a presentation page as a projected image on a whiteboard;
computer usable program code for identifying a set of markups on the whiteboard associated with the presentation page;
computer usable program code for isolating the set of markups from the presentation page to create a user input layer, wherein the user input layer is saved as an overlay for the presentation page;
wherein the set of markups is a series of marks of an arbitrary color forming a color markup layer on the whiteboard, and wherein the computer usable program code for isolating the set of markups further includes:
computer usable program code for replacing the projected image of the presentation page with a projected background to illuminate the color markup layer, wherein the projected background is a white or gray background;
computer usable program code for capturing an image of the color markup layer on the whiteboard to form a user input layer;
computer usable program code for replacing the projected background with the projected image of the presentation page after the color markup layer is captured;
computer usable program code for projecting a calibration image onto the whiteboard, wherein the calibration image comprises a white target area on a black background;
computer usable program code for filling in the white target with a black marker; and
computer usable program code for comparing a black level of the black marker in the target area with a black level of a projected black background on the whiteboard to establish a clip level.

13. The computer program product of claim 12 wherein the set of markups is a series of black marks forming a black markup layer, and wherein the computer usable program code for isolating the set of markups further comprises:
computer usable program code for capturing an image of the presentation page and the black markup layer on the whiteboard; and
computer usable program code for isolating the black markup layer from the presentation page based upon a differentiation of a first black level of the black markup layer relative to a second black level of the presentation page to form a user input layer.

14. The computer program product of claim 12 further comprising:
computer usable program code for utilizing the clip level to isolate the black markup layer from the presentation page.

15. The computer program product of claim 12 wherein the set of markups on the whiteboard associated with the presentation page are created by a first active user that controls a markup capture, and further comprising:
computer usable program code for transferring control of the markup capture to a second active user at a remote meeting location, wherein one or more additional user input layers are captured in association with the presentation page.

16. An apparatus for capturing markup layers on a whiteboard in relation to a projected image, the apparatus comprising:
a storage device connected to a bus, wherein the storage device contains a computer usable program product; and
a processor, wherein the processor unit executes the computer usable program code to display a presentation page as a projected image on a whiteboard; identify a set of markups on the whiteboard associated with the presentation page; isolate the set of markups from the presentation page to create a user input layer, wherein the user input layer is saved as an overlay for the presentation page; wherein the set of markups is a series of black marks forming a black markup layer, and wherein the step of isolating the set of markups further includes: capturing an image of the presentation page and the black markup layer on the whiteboard; isolate the black markup layer from the presentation page based upon a differentiation of a first black level of the black markup layer relative to a second black level of the presentation page to form a user input layer; project a calibration image onto the whiteboard, wherein the calibration image comprises a white target area on a black background; fill in the white target with a black marker; and compare a black level of the black marker in the target area with a black level of a projected black background on the whiteboard to establish a clip level.

* * * * *